United States Patent Office.

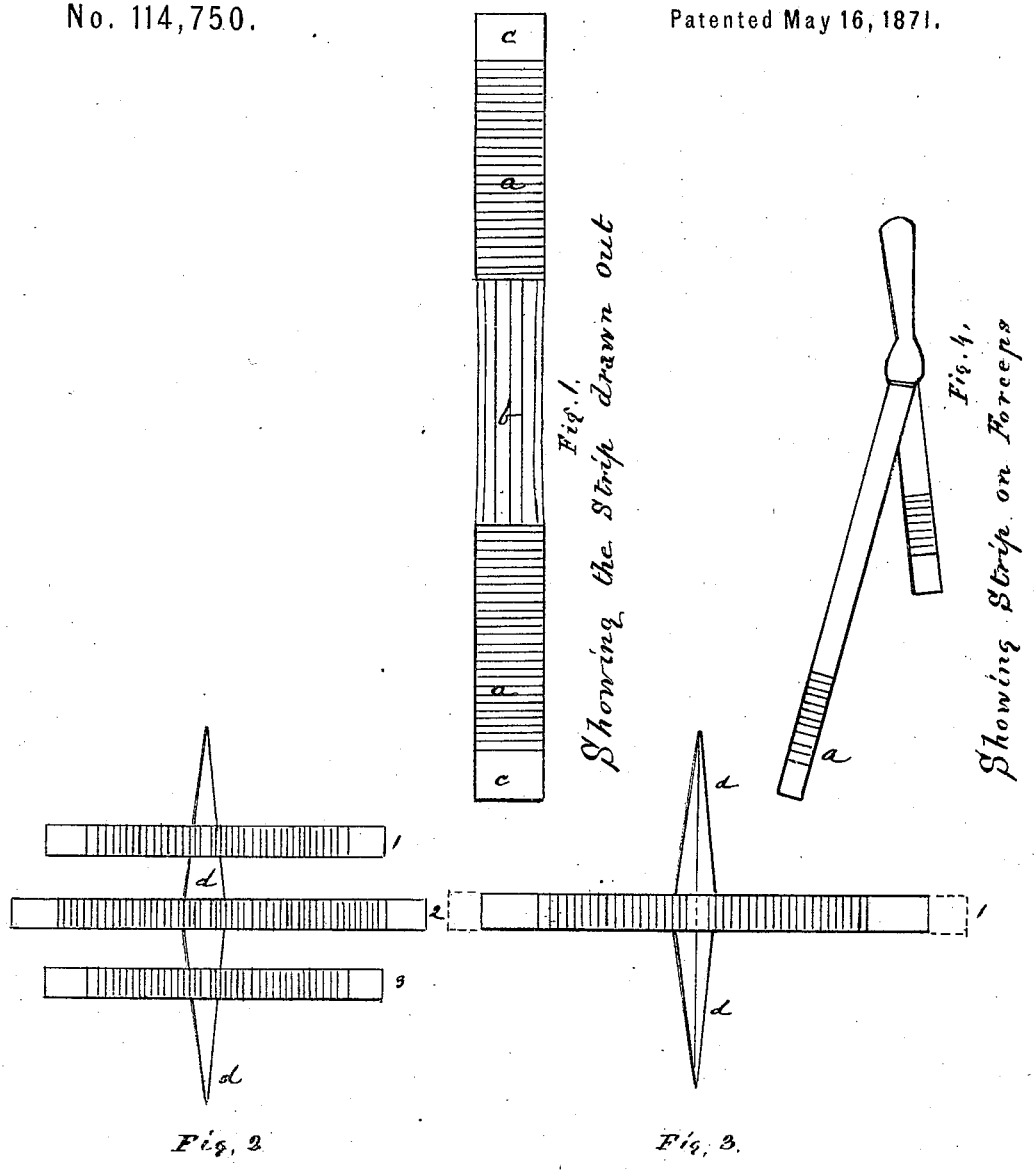

JENYNS C. BATTERSBY, OF NEW YORK, N. Y.

Letters Patent No. 114,750, dated May 16, 1871.

IMPROVEMENT IN STICKING OR ADHESIVE PLASTERS.

The Schedule referred to in these Letters Patent and making part of the same.

*To all whom it may concern:*

Be it known that I, JENYNS C. BATTERSBY, of the city and State of New York, have invented a new and useful Improvement in Sticking or Adhesive Plasters for surgical, medical, and curative purposes; and that the following is an exact and full description of my said invention and of the manner of making and using the same.

The nature of my invention consists in making the cloth or strip, which is to constitute the plaster, of an elastic fabric, such as India rubber, for example, having the adhesive material upon the under surface toward the ends of the plaster, and leaving the elastic space between uncovered by the adhesive matter, this space thus not having any adhesive matter upon it being elastic, and being distended when applied to the injured part, and the adhesive parts being applied to the sides or surrounding parts of the wound until they adhere sufficiently, the contractible power of the rubber draws the lips of the wound together and closes them, so that the air is excluded and the healing thereby promoted and facilitated.

In constructing my adhesive contractible plasters I use thin strips of India rubber for the elastic material, because I consider that substance as the best and most convenient for the purpose; but I do not confine my invention to the use of India rubber merely, for my invention covers the use of any other elastic material suitable for the purpose.

The rubber cloth or fabric used for the adhesive contractible plaster may be in strips, varying in width from the eighth of an inch to two inches or more, and having the elastic spaces between the parts of the surface which are covered with adhesive matter from about the eighth of an inch to two inches or more in length, as may be required to meet the necessities of the case or the nature of the wound to be treated.

In the drawing—

Figure 1 represents a strip of the elastic plaster distended, preparatory to being applied over the wound or cut, *a a* representing the parts on which the adhesive matter is spread; *b*, the elastic intermediate part of the plaster.

*c c* represent the extremities of the plaster-strip not covered by adhesive matter, and by which the strip or plaster is held between the thumbs or fingers, distended, when being applied.

Figure 2 represents the cut or wound *d*, having across it in place three separate strips, 1 2 3, of adhesive elastic plaster.

Figure 3 represents the cut or wound *d*, having a single plaster-strip, 1, across it, the center of the strip being over the central line of the cut or wound.

Figure 4 represents an elastic plaster-strip, one end of which, *a*, is to be affixed to near the side of the wound by adhesion; the other end is passed through the eye or ring of a forceps, and turned over so as to catch, and which is intended for use when the end of the strap is to be applied, when it will not adhere by the adhesive matter.

In making my adhesive contractible plaster any of the adhesive compounds now in use for plasters may be applied directly to the rubber fabric.

Court-plaster and other adhesive plasters may be used in the same way upon the elastic plaster-strips for the adhesive portions.

The degree or force of the contractible power will be in the ratio of the thickness and strength of the rubber, and to the amount of distension of the rubber where it is applied upon the cut or wound; and the degree of compression or contraction can thus be graduated to suit the case, according to the judgment of the operator.

The contractible effect of the plaster thus constructed and applied will close the edges or lips of the wound or cut, and will exclude the air from the wound, and thus promote healing; and the wound may be bathed or sponged without removing the plaster, and without irritating the interior of the wound.

The elastic adhesive plaster may be used in some surgical cases, in the place of the ordinary retracting-hooks, to advantage.

In cases of cuts or wounds on horses and domestic animals, this contractible plaster is invaluable to the veterinary practitioner, as it will gently draw together and close the lips of wounds or cuts, even in cases where sweating exists, if applied before the wound is too old, thus obviating the necessity of suture, which is sometimes extremely difficult to apply; and it prevents the lips of the wound from gaping, and favors healing by more than mere granulation, which latter process often causes cicatrices, varying in size and shape, and which are ever liable to injury by the currycomb and brush, and in horses are often great blemishes upon the beauty and appearance of the animal.

The elastic contractible plaster, by its ready accommodation to all necessary muscular action in the neighborhood of the injury, is a much more comfortable dressing than other less yielding applications, and consequently conduces to more rapid recovery, and thus reduces the danger of gangrenous sloughing of wounds and the consequent cicatrice, which is often accompanied by great sensitiveness to changes of the atmosphere, and are unsightly in appearance.

Having thus described my invention, and the manner of constructing and using the same,

What I claim therein as my invention, and for which I desire Letters Patent, is—

The elastic contractible adhesive plaster, constructed, used, and applied substantially in the manner and for the purposes described.

JENYNS C. BATTERSBY.

Witnesses:
THOS. P. OKIE, Jr.,
J. B. STAPLES.